US005818135A

United States Patent [19]

Riedl et al.

[11] Patent Number: 5,818,135

[45] Date of Patent: Oct. 6, 1998

[54] VIBRATION GENERATOR FOR GENERATING A DIRECTED VIBRATION

[75] Inventors: Franz Riedl, München; Thomas Bromberger, Train; Thomas Reiter, Erding, all of Germany

[73] Assignee: Wacker Werke GmbH & Co. KG, München, Germany

[21] Appl. No.: 768,481

[22] Filed: Dec. 18, 1996

[30] Foreign Application Priority Data

Dec. 18, 1995 [DE] Germany ........................ 195 47 043.5

[51] Int. Cl.[6] ............................. F16H 33/02; B01F 11/00

[52] U.S. Cl. ............................ 310/81; 310/74; 310/75 D; 310/83; 74/61; 74/87; 173/49

[58] Field of Search ................................. 310/81, 74, 83, 310/75 D; 74/1, 87, 572; 173/49, 61

[56] References Cited

U.S. PATENT DOCUMENTS

| | | | |
|---|---|---|---|
| 4,050,527 | 9/1977 | Lebelle | 173/49 |
| 5,010,778 | 4/1991 | Riedl | 74/61 |

*Primary Examiner*—Steven L. Stephan
*Assistant Examiner*—Tran N Nguyen
*Attorney, Agent, or Firm*—Robert W. Becker & Associates

[57] ABSTRACT

A vibration generator for generating directed vibrations in a compacting device includes a housing and a first and second flyweight shafts rotatably supported in the housing and extending parallel at a distance to one another. The flyweight shafts have a respective flyweight connected thereto. A first and second intermediate shafts are rotatably supported in the housing and extend parallel to and between the first and second flyweight shafts. Gear wheels positive-lockingly connect the first and second intermediate shafts to one another, the first intermediate shaft to the first flyweight shaft, and the second intermediate shaft to the second flyweight shaft. In this manner, the first intermediate shaft and the first flyweight shaft, respectively, the second intermediate shaft and the second flyweight shaft rotate in opposite directions. One of the intermediate shafts has connected thereto two gear wheels, with one being coupled to the first flyweight shaft and another coupled to the second flyweight shaft. A rotational drive for driving the first and second flyweight shafts so as to rotate in opposite directions with identical rpm is provided. A phase-adjusting mechanism changes in a controlled manner the phase angle between the first and second flyweight shafts by adjusting the angular position of one of the two gear wheels relative to the second intermediate shaft in a controlled manner during operation of the vibration generator.

14 Claims, 3 Drawing Sheets

VIBRATION GENERATOR FOR GENERATING A DIRECTED VIBRATION

BACKGROUND OF THE INVENTION

The present invention relates to a vibration generator for generating a directed vibration in a compacting device, especially a device for compacting soils. The vibration generator comprises two flyweight shafts each comprising flyweights. The shafts extend at a distance to one another parallel within the housing and which are driven by a rotational drive in opposite directions at the same rpm. The respective phase position of the flyweight shafts, that are connected positive lockingly to one another by gear wheels, can be changed in a controlled manner.

In known vibration generators the flyweight shafts are coupled with one another by meshing gear wheels one of which is positioned on one of the flyweight shafts and the other on the other flyweight shaft so as to be concentrically arranged relative to the respective rotational axes and fixedly connected to the respective shafts. A change of the respective phase position of the flyweight shafts that are coupled positive-lockingly via the gear wheels is performed in a controlled manner such that the angular position of at least one of the two gear wheels relative to its shaft can be adjusted.

The known vibration generators are, in general, driven by a drive motor which drives via a transmission a gear wheel or a belt pulley connected to an end of one of the two flyweight shafts extending from the vibrator housing.

The phase position of the two flyweight shafts relative to one another is changeable with a control mechanism such that the vector of the directed vibrations produced by the vibration generator is adjustable in a plane parallel to the direction of movement about an angular range relative to the centroidal axis of the compacting device positioned on the ground so that the vector, relative to the centroidal axis, is slanted more or less in or counter to the direction of movement or extends parallel to the centroidal axis.

In the slanted positions of the vector of the directed vibrations relative to the centroidal axis, in addition to the forward forces generated by the flyweights, there is also a tilting moment exerted onto the vibrator housing and the compacting device connected thereto. However, in known devices this tilting moment is relatively small due to the small distance between the two flyweight shafts and therefore has only a limited effect onto the movement behavior of the compacting device to which the vibration generator is connected.

However, it has been found that for certain types of soils the effectiveness of the compacting device can be substantially improved with an increased tilting moment because it causes a distinct peeling effect which increases the advancing moment and thus the movability across terrain of the compacting device, especially of a vibration plate, on sticky soils in a substantial manner.

It is therefore an object of the present invention to provide a vibration generator with increasing tilting moment especially during advancing movement which, however, still maintains the substantially minimal constructive height of known vibration generators.

SUMMARY OF THE INVENTION

A vibration generator for generating directed vibrations in a compacting device according to the present invention is primarily characterized by:

A housing;

A first flyweight shaft and a second flyweight shaft rotatably supported in the housing and extending parallel at a distance to one another;

The first flyweight shaft having a first flyweight connected thereto and the second flyweight shaft having a second flyweight connected thereto;

A first intermediate shaft and a second intermediate shaft rotatably supported in the housing and extending parallel to the first and second flyweight shafts between the first and second flyweight shafts;

Gear wheels for positive-lockingly connecting the first and second intermediate shafts to one another and for connecting the first intermediate shaft 4 to the first flyweight shaft so that the first intermediate shaft and the first flyweight shaft rotated in opposite directions and for connecting the second intermediate shaft to the second flyweight shaft so that the second intermediate shaft and the second flyweight shaft rotate in opposite directions;

One of the first and the second intermediate shafts having connected thereto two gear wheels, wherein a first one of the two gear wheels is coupled to the first flyweight shaft and a second one of the two gear wheels is coupled to the second flyweight shaft;

A rotational drive for driving the first and second flyweight shafts so as to rotate in opposite directions with identical rpm;

A phase-adjusting mechanism for changing in a controlled manner a phase angle between the first and second flyweight shafts by adjusting an angular position of one of the two gear wheels relative to the second intermediate shaft in a controlled manner during operation of the vibration generator.

The rotational drive is drivingly connected to the first intermediate shaft.

The first and second intermediate shafts and the first and second flyweight shafts are preferably positioned substantially within in a common plane.

The phase-adjusting mechanism preferably comprises a slide member axially slidably mounted within the second intermediate shaft. A phase control drive for axially displacing the slide member is provided. A pin projects through a slot of the second intermediate shaft radially outwardly from the second intermediate shaft and is connected to the slide member such that the pin is axially displaceable with the slide member. One of the two gear wheels has a hub with an inner groove and the pin engages the inner groove. The inner groove and the slot extend preferably at a slant to one another.

The phase control drive is preferably a hydraulic working cylinder.

The rotational drive is a hydraulic motor connected to the exterior of the housing.

Advantageously, the vibration generator further comprises a positioning device for each one of the first and second flyweight shafts, wherein the first flyweight is comprised of first flyweight members movable relative to one another on the first flyweight shaft between an end position of maximum unbalance moment and an end position of minimum unbalance moment by a respective one of the positioning devices. The second flyweight is comprised of second flyweight members movable relative to one another on the second flyweight shaft between an end position of maximum unbalance moment and an end position of minimum unbalance moment by a respective one of the positioning devices.

In a first embodiment, the positioning devices move the flyweight members automatically depending on the rpm of the first and second flyweight shafts. In another embodiment of the present invention, the positioning devices are externally controlled for moving the flyweight members. The flyweight members can be continuously adjustable between the end positions or adjustable in a stepped manner between the end positions.

Preferably, the positioning devices are mounted within the flyweight shafts.

Preferably, each one of the positioning devices comprises a slide member axially slidably mounted within a respective one of the first and second flyweight shafts. A control device for axially displacing the slide member is provided. A pin projects through a slot of the respective one of the first and second flyweight shafts so as to extend radially outwardly from the respective one of the first and second flyweight shafts and is connected to the slide member such that the pin is axially displaceable with the slide member. One of the flyweight members has an inner wall with an inner groove and the pin engages the inner groove. The inner groove and the slot extend at a slant to one another.

Preferably, the control device is a hydraulic working cylinder.

By positioning the two intermediate shafts between the flyweight shafts the axial distance, in comparison to vibration generators of known designs with directly coupled flyweight shafts, is substantially enlarged so that the tilting moment is considerably increased without having to increase the constructive size of the vibration generator since the gear wheels, despite the greater distance between the flyweight shafts, do not necessarily require a greater diameter than the ones used in the vibration generators of known designs.

A further considerable advantage of the inventive construction is that the phase-adjusting mechanism for adjusting the phase angle between the flyweights must no longer be directly combined with the flyweight shafts since the intermediate shafts can be used for this purpose. When using one or the other intermediate shaft for the aforementioned purpose, the flyweight shafts are not obstructed so that there is enough space available for providing flyweights, respectively, divided flyweight members that are displaceable relative to one another for adjusting the m·r value as a function of frequency automatically or in a directed manner based on certain parameters.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
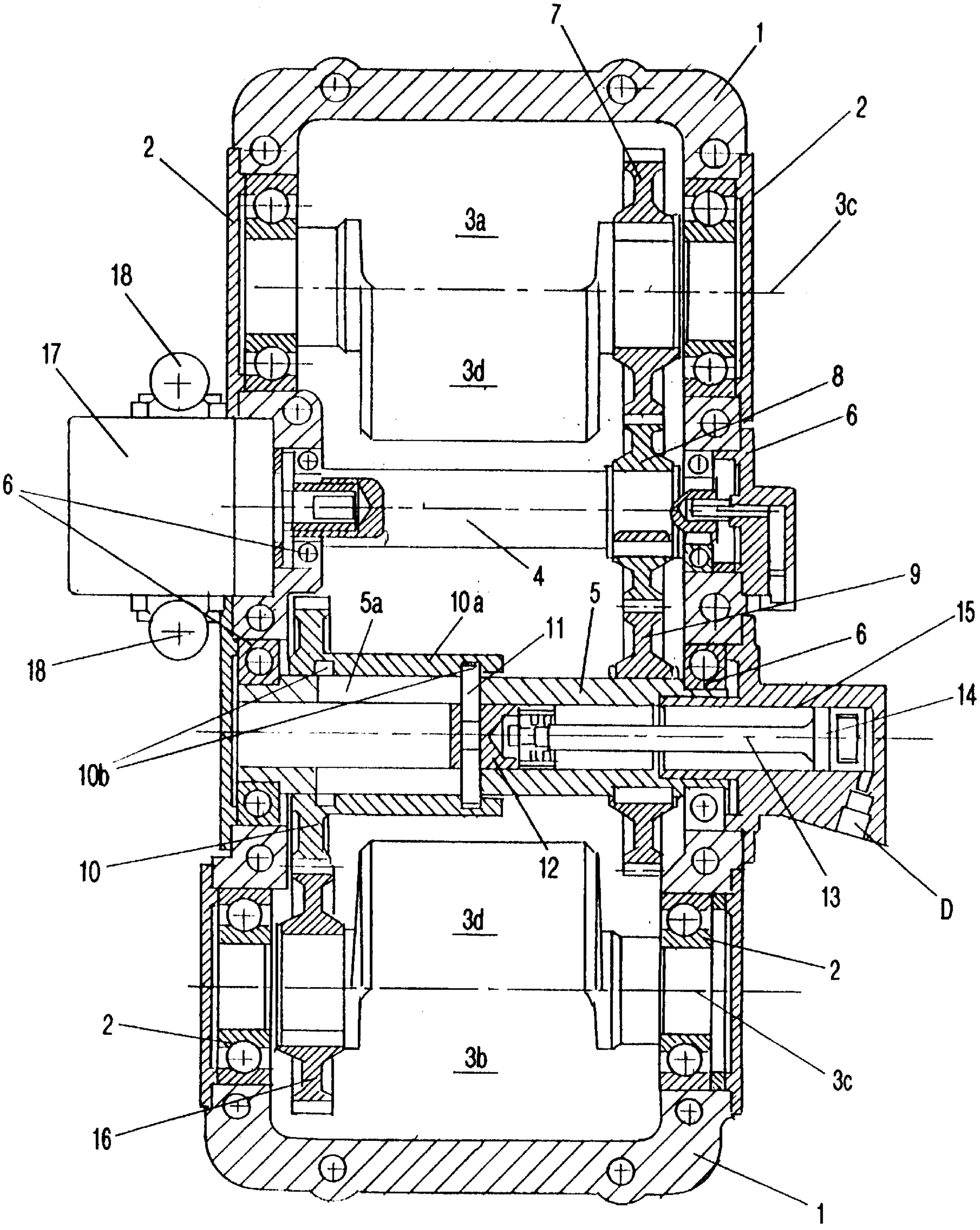
FIG. 1 shows a vibration generator in a plan view, partly in cross-section along the rotational axis of the flyweight shafts.

The present invention will now be described in detail with the aid of several specific embodiments utilizing FIGS. 1 through 5.

The vibration generator represented in various embodiments in the drawings comprises in all of the shown embodiments a vibrator housing 1 enclosing the interior in which the flyweight shafts 3*a,* 3*b* are positioned whereby the two flyweight shafts 3*a,* 3*b* are supported with roller bearings 2 within the housing and extend parallel to one another. In a manner known per se, the flyweight shafts 3*a,* 3*b* are provided with flyweights that are eccentrically arranged relative to the axis of rotation 3*c*.

Between the flyweight shafts 3*a* and 3*b* two intermediate shafts 4 and 5 are positioned and rotatably supported with further roller bearings 6 within the vibrator housing 1. They have axes of rotation 4*c,* 5*c* extending parallel to the axes of rotation 3*c* of the flyweight shafts 3*a,* 3*b*.

In the shown embodiment, the intermediate shafts 4 and 5 are arranged in the vibrator housing 1 such that their respective axes of rotation 4*c,* 5*c* are positioned in the same plane as the axes of rotation 3*c* of the flyweight shafts 3*a,* 3*b*. However, this is not a necessary in all cases since the shafts, with respect to machine-specific projected axial distances of the intermediate shafts 4 and 5, must not necessarily be positioned in the same plane.

The flyweight shaft 3*a* and the intermediate shaft 4 are coupled to one another with gear wheels 7 and 8 that are fixedly connected to the respective shafts. The gear wheel 8 on the intermediate shaft 4 meshes also with the gear wheel 9 fixedly connected to the intermediate shaft 5.

A further gear wheel 10 is arranged on the intermediate shaft 5 so as to be coaxially arranged to its axis of rotation 5*c*. The gear wheel 10 comprises a hub 10*a* which surrounds the intermediate shaft 5 so as to be slidable thereon. The hub 10*a* is provided at its inner surface with an inner spiral double groove 10*b* which is engaged by a respective pin 11. The pin 11 projects on opposite sides of the intermediate shaft 5 into each one of the double groove portions, displaced by 180° relative to one another. The pin ends extend through axial longitudinal slots 5*a* provided at both sides of the intermediate shaft 5. The pin 11 extends perpendicularly to the axis of rotation 5*c* of the intermediate shaft 5 and penetrates an actuating slide member 12 that is axially slidably arranged within the hollow interior of the intermediate shaft 5 and adjustable in a controlled manner by an actuating member 13. The actuating member 13 is fixedly connected to the slide member 12 in the axial direction but is rotatable relative to it so that the intermediate shaft 5 can rotated together with the slide member 12 without entraining the actuating member 13 of a phase control drive (13, 14, 15). The actuating member 13 terminates in a piston 14 which is sealingly guided in a cylinder 15 parallel to the axis of rotation 5*c* and is loadable with a pressure medium D from the exterior at a side facing away from the slide member 12. When the piston 14 of the phase control drive in the position represented in FIG. 1 is loaded with pressure medium, it is displaced to the left of FIG. 1 so that the pin 11 is displaced along the axis of rotation 5*c*. This results in the angular position of the gear wheel 10 being changed relative to the intermediate shaft 5. When the pressure acting on the piston 14 is relieved, the piston 14 is returned by a return force exerted thereon by the slide member 12 into its rest position.

The gear wheel 10 meshes directly with a further gear wheel 16 that is fixedly connected concentrical to the rotational axis 3*c* to the other flyweight shaft 3*b*.

The intermediate shaft 4 is driven by a hydraulic motor 17 which is coupled to the left end face of the intermediate shaft 4. The hydraulic motor 17 is loadable via pressure medium connectors 18 in a controlled manner and drives the intermediate shaft 4, depending on the flow direction of the incoming pressure medium, into one or the other direction of rotation. The rotating intermediate shaft 4 rotates via the gear wheel 8 and the gear wheel 7, on the one hand, the flyweight shaft 3*a* and via the gear wheel 8 and the gear wheel 9, on the other hand, the other intermediate shaft 5. The intermediate shaft 5, in turn, rotates via the gear wheel 10 and the gear wheel 16 the other flyweight shaft 3*b*.

Figure 2:
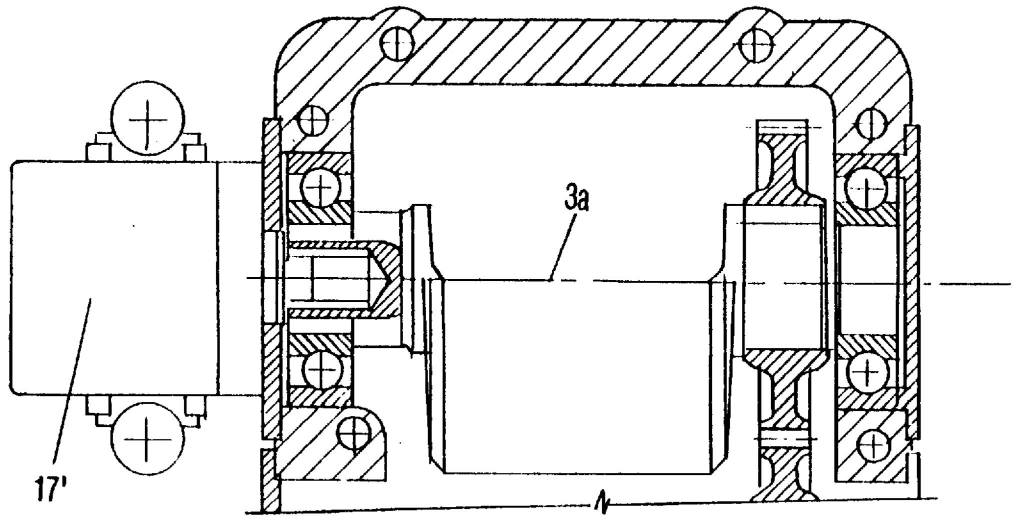
FIG. 2 shows a variant of the vibration generator of FIG. 1 relating to the introduction of drive forces.

FIG. 2 shows a variant of the vibration generator according to FIG. 1 in which the hydraulic motor 17' which provides the drive unit for the vibration generator does not engage the intermediate shaft 4 but instead the flyweight shaft 3*a*.

Figure 3:
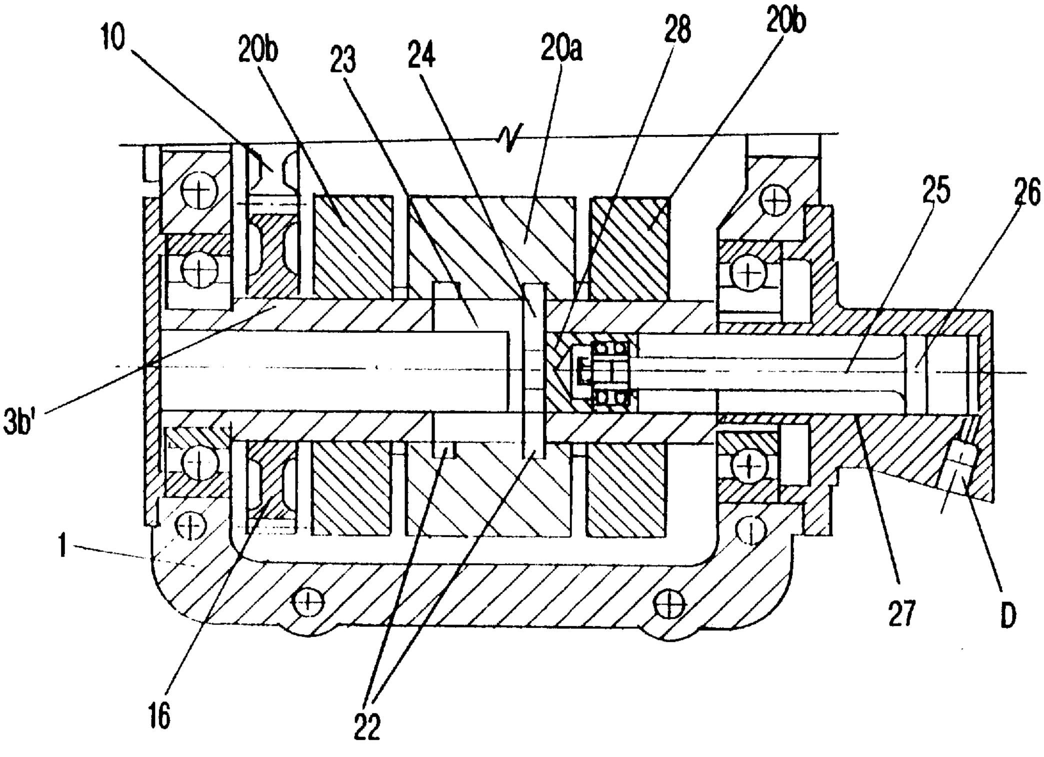
FIG. 3 shows a variant of the vibration generator according to FIG. 1 relating to the design of the flyweight shafts.
Figure 4:
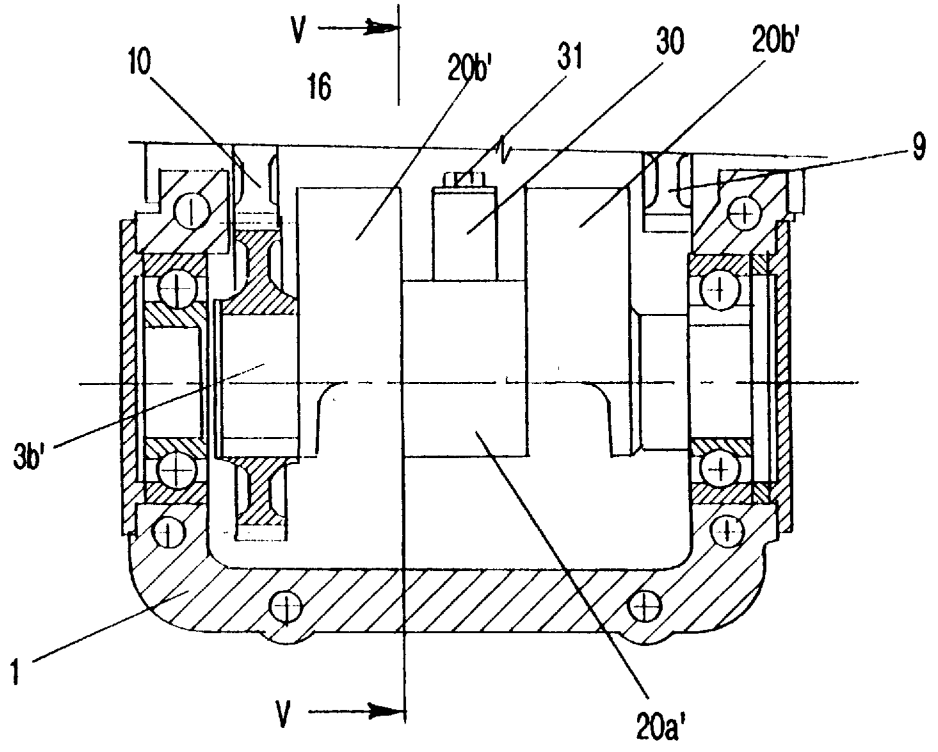
FIG. 4 shows a further embodiment of the vibration generator of FIG. 1 relating to the design of the flyweight shafts.
Figure 5:
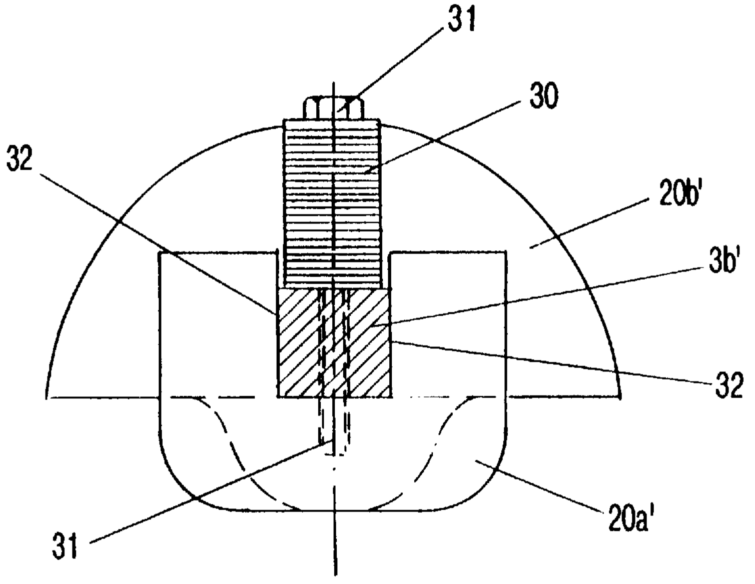
FIG. 5 shows a cross-section of the vibration generator along the section line V—V in FIG. 4.

In any case, the design of the vibration generator according to FIGS. 1 and 2 has the advantage that the two flyweight shafts 3*a* and 3*b* must not be provided with a mechanism for phase adjustment and are thus available for mounting thereon other adjusting or positioning mechanisms, especially devices for changing the m·r values of the flyweight shafts 3*a'*, 3*b'* shown in FIGS. 3 through 5.

In the embodiment according to FIG. 3, two flyweights 20*b* are fixedly connected on the flyweight shaft 3*b'*. Between them flyweights 20*a* are positioned so as to be slidable and rotatable relative to the fixedly arranged flyweights 20*b*. The flyweight 20*a* is adjustable relative to the flyweight shaft 3*b'* with a mechanism that is similar to the one with which the gear wheel hub 10 is displaced relative to the intermediate shaft 5 and functions in the same manner. The inner wall of the adjustable flyweight 20*a* is provided with an inner spiral double groove 22 and the groove is engaged by a pin 24 engaging with its opposite ends the oppositely (180°) displaced portions of the double groove 22. The pin may extend through an axial longitudinal slot 23 of the flyweight shaft 3*b'* to opposite sides thereof. The pin 24 extends perpendicularly to the axis of rotation of the flyweight shaft 3*b'* and penetrates an actuating slide member 28 which is guided within the hollow interior of the flyweight shaft 3*b'* in an axially slidable manner so as to be controllably adjustable by a control device 25, 26, 27. The actuating member 25 of the control device is connected to the slide member 28 so as to be axially fixed but rotationally supported thereat, i.e., the flyweight shaft 3*b'* can rotate with the slide member 28 without entraining the actuating member 25. The actuating member 25 terminates in a piston 26 which is sealingly guided in a cylinder 27 and extends parallel to the axis of rotation of the flyweight shaft 3*b'*. It can be loaded by a pressure medium D that can be introduced on a side facing away from the slide member 28. When the piston 26 is in the position represented in FIG. 3 and loaded with a pressure medium, it is displaced to the left of FIG. 3 so that the pin 24 is displaced to the left along the axis of rotation of the flyweight shaft 3*b'*. This causes a change of the angular position of the rotatable flyweight part 20*a* relative to the flyweight shaft 3*b'* so that the resulting total unbalance moment of the flyweight members 20*b* and 20*a*, i.e., the m·r value of the flyweight shaft 3*b'* is changed.

When the pressure medium acting on the piston 26 is relieved, the piston is displaced into its rest position by the return force exerted by the slide member 28.

It is clear from the drawings that the embodiment of FIG. 3 provides for a continuous adjustment of the total unbalance moment between a minimum value and a maximum value.

In the same manner as disclosed in conjunction with the flyweight shaft 3*b'*, the non-represented flyweight shaft 3*a'* can also be adjusted with respect to its m·r value in the same manner whereby the adjustment of both flyweight shafts is performed simultaneously. Vibration generators embodied according to FIG. 3 thus can be controlled as desired with respect to their m·r values. Via the m·r values it is also possible to control in an optimal manner the aforementioned tilting moments for producing the desired peeling effect.

In the embodiment represented in FIGS. 4 and 5 a continuous change of the resulting total unbalance moment of the flyweight shafts 3*b'* is carried out as a function of the rpm of the shaft. For this purpose, in this embodiment the flyweights are comprised of two stationary members 20*b'* and an intermediate adjustable flyweight member 20*a'* which, in contrast to the embodiment of FIG. 3, is displaceable in the radial direction relative to the stationary flyweight members 20*b* but is not rotatable. The displaceable flyweight members 20*a* surrounds the flyweight shaft 3*b'* as a U-shaped part with parallel gliding surfaces 32 and, in the starting position represented in FIG. 5, is secured at standstill and for low rpm with a transverse stay, including a plate spring packet 30, on the flyweight shaft 3*b'*. This plate spring packet 30 surrounds a tensioning screw 31 which penetrates the flyweight shaft 3*b'* in a gliding manner and which is inserted and threaded into a threaded bore within the transverse stay of the adjustable flyweight member 20*a*. With increasing rpm of the flyweight shaft 3*b'*, the adjustable flyweight member 20*a* exerts an increasing radially directed force onto the screw 31 that is transmitted, in turn, onto the end of the spring packet 30 facing away from the flyweight shaft 3*b'*. The force increasing with increasing rpm compresses to an increasingly greater extent the spring packet 30 and this results in a displacement of the adjustable flyweight member 20*a* radially outwardly away from the flyweight shaft 3*b'*. This causes a change of the resulting total unbalance moment, i.e., a change of the m·r value. In the embodiment according to FIG. 4 and 5, the m·r value is decreased with increasing rpm. This is also desired for the embodiment according to FIG. 3.

In the same manner as in the embodiment according to FIG. 3, in the embodiment according to FIGS. 4 and 5 the m·r value of the non-represented flyweight shaft 3*a'* can be adjusted in the same manner as disclosed in connection with the flyweight shaft 3*b'*.

The present invention is, of course, in no way restricted to the specific disclosure of the specification and drawings, but also encompasses any modifications within the scope of the appended claims.

What we claim is:

1. A vibration generator for generating directed vibrations in a compacting device, said vibration generator comprising:

a housing;

a first flyweight shaft and a second flyweight shaft rotatably supported in said housing and extending parallel at a distance to one another;

said first flyweight shaft having a first flyweight connected thereto and said second flyweight shaft having a second flyweight connected thereto;

a first intermediate shaft and a second intermediate shaft rotatably supported in said housing and extending parallel to said first and second flyweight shafts in a space between said first and second flyweight shafts;

said first and second intermediate shafts being without flyweights;

gear wheels for positive-lockingly connecting said first and second intermediate shafts to one another and for connecting said first intermediate shaft to said first flyweight shaft so that said first intermediate shaft and said first flyweight shaft rotate in opposite directions and for connecting said second intermediate shaft to said second flyweight shaft so that said second intermediate shaft and said second flyweight shaft rotate in opposite directions;

one of said first and said second intermediate shafts having connected thereto two of said gear wheels, wherein a first one of said two gear wheels is coupled to said first flyweight shaft and a second one of said two gear wheels is coupled to said second flyweight shaft;

a rotational drive for driving said first and second flyweight shafts so as to rotate in opposite directions with identical rpm (revolutions per minute);

a phase-adjusting mechanism, connected within one of said first and second intermediate shafts, for changing in a controlled manner a phase angle between said first and second flyweight shafts by adjusting an angular position of one of said two gear wheels relative to said second intermediate shaft in a controlled manner during operation of said vibration generator.

2. A vibration generator according to claim 1, wherein said rotational drive is drivingly connected to said first intermediate shaft.

3. A vibration generator according to claim 1, wherein said first and second intermediate shafts and said first and second flyweight shafts are substantially positioned within a common plane.

4. A vibration generator according to claim 1, wherein said phase-adjusting mechanism comprises:

a slide member axially slidably mounted within said second intermediate shaft;

a phase control drive for axially displacing said slide member;

a pin projecting through a slot of said second intermediate shaft radially outwardly from said second intermediate shaft and connected to said slide member such that said pin is axially displaceable with said slide member;

said one of said two gear wheels having a hub with an inner groove, wherein said pin engages said inner groove; and said inner groove and said slot extending at a slant to one another.

5. A vibration generator according to claim 4, wherein said phase control drive is a hydraulic working cylinder.

6. A vibration generator according to claim 1, wherein said rotational drive is a hydraulic motor connected to the exterior of said housing.

7. A vibration generator according to claim 1, further comprising a positioning device for each one of said first and second flyweight shafts, wherein said first flyweight is comprised of first flyweight members movable relative to one another on said first flyweight shaft between an end position of maximum unbalance moment and an end position of minimum unbalance moment by a respective one of said positioning devices, and wherein said second flyweight is comprised of second flyweight members movable relative to one another on said second flyweight shaft between an end position of maximum unbalance moment and an end position of minimum unbalance moment by a respective one of said positioning devices.

8. A vibration generator according to claim 7, wherein said positioning devices move said flyweight members automatically depending on the rpm of said first and second flyweight shafts.

9. A vibration generator according to claim 7, wherein said positioning devices are externally controlled for moving said flyweight members.

10. A vibration generator according to claim 9, wherein said flyweight members are continuously adjustable between said end positions.

11. A vibration generator according to claim 9, wherein said flyweight members are adjustable in a stepped manner between said end positions.

12. A vibration generator according to claim 9, wherein said positioning devices are mounted within said flyweight shafts.

13. A vibration generator according to claim 9, wherein each one of said positioning devices comprises:

a slide member axially slidably mounted within a respective one of said first and second flyweight shafts;

a control device for axially displacing said slide member;

a pin projecting through a slot of said respective one of said first and second flyweight shafts so as to extend radially outwardly from said respective one of said first and second flyweight shafts and connected to said slide member such that said pin is axially displaceable with said slide member;

one of said flyweight members having an inner wall with an inner groove, wherein said pin engages said inner groove; and said inner groove and said slot extending at a slant to one another.

14. A vibration generator according to claim 13, wherein said control device is a hydraulic working cylinder.

* * * * *